United States Patent [19]
Binks

[11] Patent Number: 4,564,406
[45] Date of Patent: Jan. 14, 1986

[54] METHOD OF AND MEANS FOR COMBINATION DESIGN TRANSFER AND APPLICATION OF HEAT REACTIVATABLE ADHESIVE

[75] Inventor: Chester J. Binks, LaGrange, Ill.

[73] Assignee: Solar-Kist Corporation, LaGrange, Ill.

[21] Appl. No.: 581,803

[22] Filed: Feb. 21, 1984

[51] Int. Cl.[4] .................... B32B 31/10

[52] U.S. Cl. .................... 156/63; 156/235; 156/289; 428/39; 428/79; 428/906.6; 434/95

[58] Field of Search .................... 112/405, 439; 156/63, 156/234, 235, 241, 289; 428/39, 79, 906.6; 434/95

[56] References Cited

U.S. PATENT DOCUMENTS

| | | | |
|---|---|---|---|
| 2,738,828 | 3/1956 | Hammer | 156/289 |
| 3,574,017 | 4/1971 | Kass | 156/63 |
| 3,783,073 | 1/1974 | Warnberg | 156/323 X |
| 4,086,379 | 4/1978 | Brown | 428/40 |
| 4,284,456 | 8/1981 | Hare | 156/234 |
| 4,495,230 | 1/1982 | Ellwein | 428/79 X |

FOREIGN PATENT DOCUMENTS

| | | | |
|---|---|---|---|
| 1042209 | 11/1978 | Canada | 156/63 |

*Primary Examiner*—Robert A. Dawson
*Attorney, Agent, or Firm*—Hill, Van Santen, Steadman & Simpson

[57] ABSTRACT

A method of providing for combination appliqué design pattern transfer and adhesive lamination to appliqué material which comprises imprinting an appliqué design pattern onto a sheet of heat reactivatable adhesive so that by fusing and laminating the adhesive sheet with the appliqué design pattern thereon onto appliqué material, the appliqué design pattern will be transferred to the appliqué material. A sheet of heat reactivatable adhesive with the appliqué design pattern imprinted thereon is also provided for.

15 Claims, 6 Drawing Figures

METHOD OF AND MEANS FOR COMBINATION DESIGN TRANSFER AND APPLICATION OF HEAT REACTIVATABLE ADHESIVE

This invention relates to the art of appliquéing, and is more particularly concerned with providing a new and improved method of and means for combination design transfer and application of heat reactivatable adhesive especially useful for appliéing.

There are now available on the market heat transfer patterns for embroidery or ball point painting, and the like. These transfers are printed on paper, and by applying the printed face of the paper onto a piece of cloth and applying heat as by means of a hot iron, the printed pattern will transfer to the cloth. Thereafter the pattern may be used for embroidering or other decorative purposes in respect to the fabric upon which the pattern has been transferred.

If desired, of course, the designs which have been transferred and embroidered or otherwise treated on the base cloth may be trimmed out and appliquéd to another base if desired.

Much appliquéing is effected by merely sewing the appliqué pieces to the base material.

On the other hand, there has developed a popular form of appliquéing which comprises interposing heat reactivatable adhesive in a dry mesh form between the appliqué and the base sheet and effecting adherence of the appliqué to the base sheet by applying heat and pressure to the assembly whereby the heat reactivatable mesh fuses and then sets and adhesively bonds the appliqueé to the base, and then sometimes sewing the edges of the appliqué piece.

By the present invention, a substantial improvement in appliquéing is provided by combining appliqué pattern design transfers with the heat reactivatable adhesive sheet material so that the pattern or design can be applied to the desired appliqué fabric coincident with fusing and laminating the adhesive sheet layer to the back of the appliqué material. Thereafter the appliqué material may be cut into appliqué pieces by following the transfer pattern on the back face of the appliqué fabric, and the pieces assembled with a base, whether a fabric or nonfabric and to which the appliqué pieces are then adapted to be bonded by reactivating the adhesive on the back faces of the pieces.

Pursuant to the principles of the present invention, there is provided a method of providing means for combination appliqué design pattern transfer and adhesive lamination to appliqué material, comprising supplying a sheet of heat reactivatable adhesive, and imprinting an appliqué design pattern onto the sheet, so that by fusing and laminating the adhesive sheet with the appliqué design pattern thereon onto appliqué material the appliqué design pattern will be transferred to said appliqué material.

The present invention also provides means for combination appliqué design pattern transfer and adhesive lamination to appliqué material, comprising a sheet of heat reactivatable adhesive, and an appliqué design pattern imprinted onto said sheet, so that by fusing and laminating said adhesive sheet with said appliqué design pattern thereon onto appliqué material said appliqué design pattern will be transferred to said appliqué material.

Other objects, features and advantages of the invention will be readily apparent from the following description of a preferred embodiment thereof, taken in conjunction with the accompanying drawing, although variations and modifications may be effected without departing from the spirit and scope of the novel concepts of the disclosure, and in which.

Figure 3:
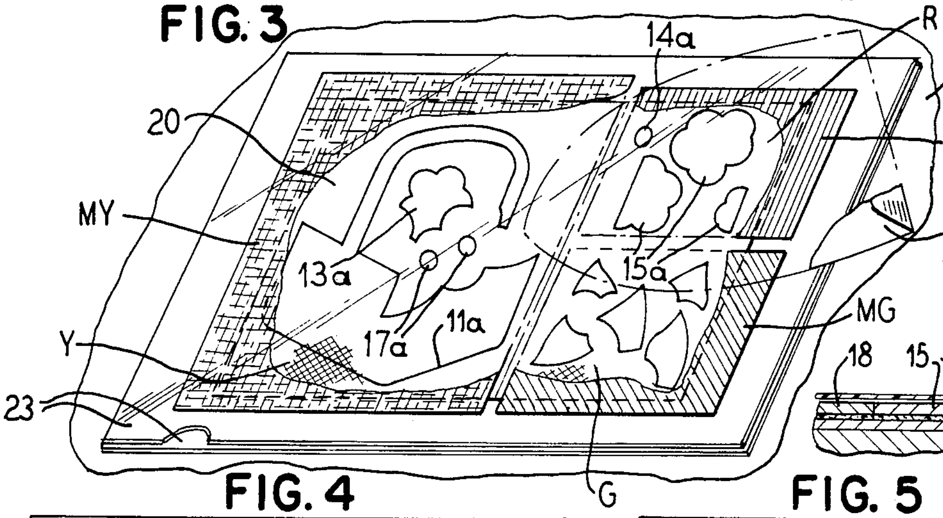
Figure 4:
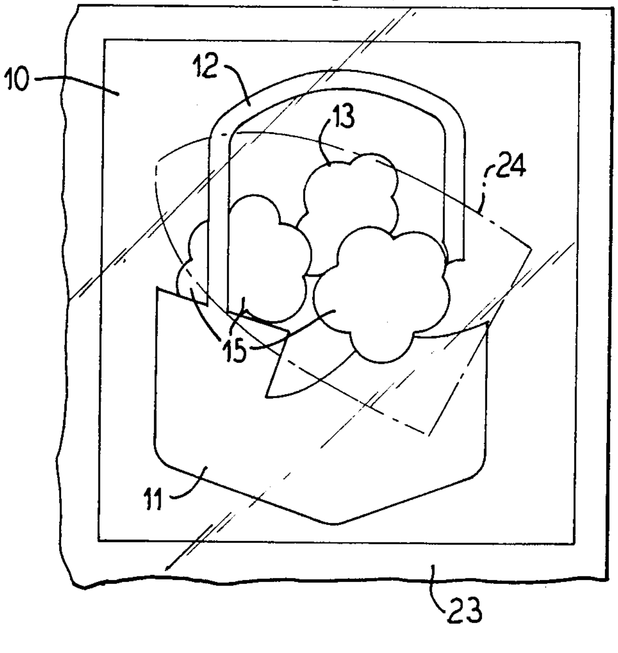
Figure 5:
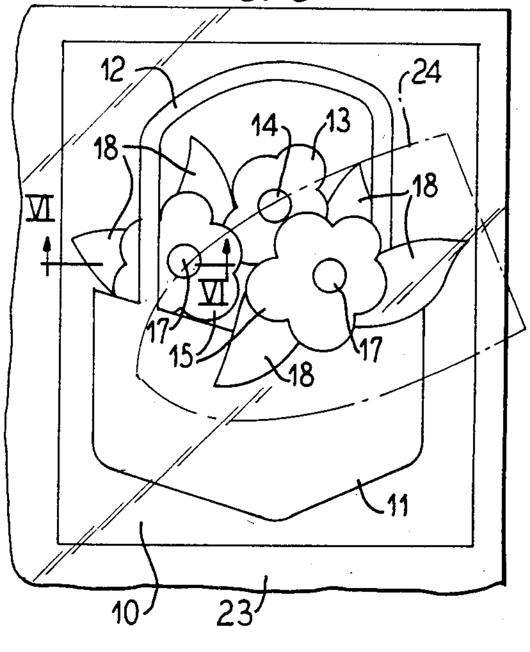

FIG. 3 demonstrates a step in the method of applying the patterned heat reactivatable adhesive to appliqué material and concurrently transfering the design patterns to the material;

FIG. 4 demonstrates a preliminary step in appliqué ing the appliqué pieces to the base panel;

FIG. 5 shows a further step in appliquéing the article; and

Figure 6:
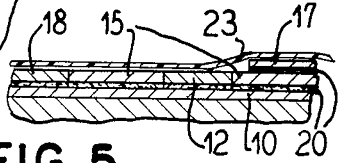

FIG. 6 is a fragmentary sectional detail view taken substantially along the line VI—VI in FIG. 5.

Figure 1:
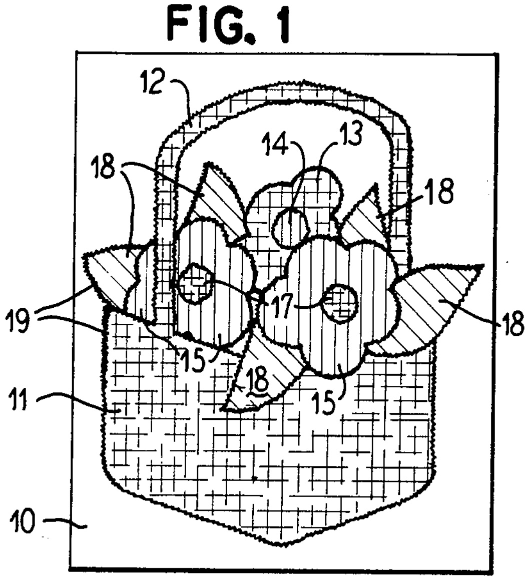
FIG. 1 is a plan view of an appliqué panel produced according to the present invention.

By way of example, there is depicted in FIG. 1 an appliqué article comprising a base panel 10 having appliquéd thereto a multipiece design which may comprise an arrangement of multicolored pieces, in this instance representing a flower basket, although it will be understood that any preferred appliqué design may be provided. As shown, the appliqué design comprises a yellow basket 11 having a handle 12. In the basket is a flower arrangement comprising a yellow flower 13 having a pink (red) center 14, pin (red) flowers 15 having yellow centers 17, and an array of green leaves 18 arranged artistically about the flowers. If desired some or all of the appliqué pieces may have their edges hemstitched as indicated at 19.

Figure 2:
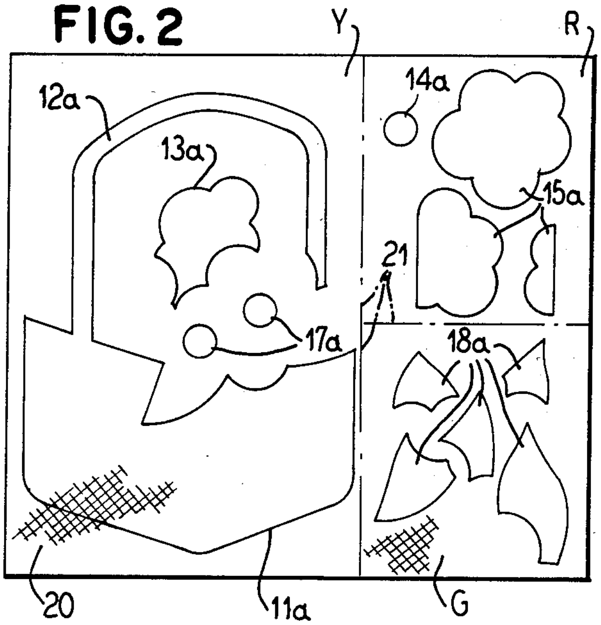
FIG. 2 is a plan view of a heat reactivatable adhesive sheet on which has been imprinted design pattern for the appliqué pieces which have been assembled in the article of FIG. 1.

According to the present invention patterns for the appliqué pieces are printed on heat reactivatable adhesive sheet material 20 (FIG. 2). Adhesive sheet material for this purpose may be of a kind such as is readily obtainable in retail establishments catering to the appliqué trade, and produced by various manufacturers under various designations and formulations. One popular brand is known as Stitch Witchery, which is a trademark of USM Corp. This material, generally referred to as fusible webbing, is a mesh structure web supplied as a thin sheet of securely bonded interlaced thin strands or fibers of the adhesive, which is a polyamide plastic. It is dry, solid and non-tacky and is form-retaining at temperatures well above maximum atmospheric weather temperatures, and will fuse, that is melt, at about 210° F. to 250° F. whereby to form an adhesive bond for compatible surfaces, and in particular most fabric material surfaces, paper, wood, and the like, and at least those materials which are commonly used for appliquéing.

A unique aspect of the present invention resides in that the patterns for the appliqué pieces are imprinted directly on the adhesive webbing sheet 20. As shown, patterns for the various appliqué pieces of the completed article in FIG. 1 are identified by the same reference numerals with the subscript "a". Thus, the pattern outline for the basket 11 is identified as 11*a* and its handle as 12*a*, the yellow flower pattern 13*a*, its center pattern 14*a*, the pattern outlines for the pink flowers are 15*a*, the outlines for their centers 17*a*, and the outlines for the leaf pieces 18*a*.

Arrangement of the various appliqué pattern outlines is desirably in designated areas on the sheet 20. For example, all of the patterns for green pieces are, as shown, confined to an area G, the red or pink patterns to an area R and the yellow patterns to area Y. To facilitate this segregation of the various patterns, the areas G, R and Y may be separated by imprinted delineations or subdivision lines 21 on the sheet 20.

Imprinting the patterns on the adhesive sheet 20 may be effected in any suitable manner by means of colored lineation as by commercial printing techniques, by block printing, such as by wood blocks or rubber stamps, by silk screening, by direct outlining by means of pencil, crayon, felt or ball point pen; or by impressed lineation comprising pressing or slotting the pattern lines in the adhesive sheet; and the like. Thus, while the imprinted mesh plastic material may be supplied with commercially imprinted pattern designs, a user may exercise his own artistic ingenuity in creating his own designs by means of a preferably ink applying implement, although crayon type marking pencils and stubby point lead pencils may be used but are not as easy to use on this material as the ink applying appliances.

Initially patterns imprinted on the interlaced thin strands or fibers of the adhesive material appear light, but distinguishable because of the openings between the strands and fibers of the adhesive material. After fusing the pattern to the back side of almost any appliqué material whether white or black, or heavily patterned, the imprint becomes more distinguishable, since the pattern lines, which were interrupted on the original fusible webbing, are now mostly connected because of the melting of the fusible webbing.

Furthermore, black lined imprinted patterns are even distinguishable on black or heavily patterned cloths because the adhesive acts as a carrier and provides a lighter and shiny background for the black printed pattern lines.

Transference of the patterns imprinted on the adhesive mesh or solid sheet or web 20 onto appliqué material, which may be any suitable material but generally fabric is adapted to be effected by fusibly applying the heat reactivatable adhesive material 20 to the appliqué material by fusing heat and pressure. This is conveniently and efficiently effected as demonstrated in FIG. 3, by placing onto a firm backing surface 22 an underlay pressing sheet surface 23 which is nonadherent to the fused adhesive, and then superimposing the imprinted adhesive web 20 on the underlay pressing sheet surface. The desired appliqué material is placed on the adhesive web 20. In order to attain the shade or color differentiation of the various appliqué pieces to be produced, the appliqué material overlying the areas G, R and Y of the heat reactivatable adhesive web 20 will conform to the differentiating color scheme. Thus, the appliqué material to overly the mesh plastic sheet area G, and identified as Mg, may be green, the appliqué material overlying the area R, and identified as MR may have the desired pink or red shade, and the appliqué material overlying the area Y and identified as MY may have the desired yellow shade.

Transference of the appliqué patterns to the appliqué sheets MG, MR and MY, and fusing of the adhesive material of the adhesive web 20 to the appliqué material is desirably effected by applying an overlay pressing sheet 23, which is nonadherent to the fused adhesive, and which may be a folded over portion of the underlay sheet 23, onto the assembly of appliqué material and underlying pattern-carrying heat reactivatable adhesive sheet 20. Then fusing heat and pressure are adapted to be applied to the assembly through the overlying pressing sheet 23 as by means of a pressing iron 24, whereby the adhesive sheet is fused and, in effect, laminated to the under sides or surfaces of the sheets of appliquéing material. Then, when the adhesive material has set onto the appliqué material sheets, the patterns are effectively transfered to the appliqué material sheets. Removal of the pressing sheet 23, which strips cleanly from the fused and set adhesive layer, releases the laminated assembly for further processing.

Material suitable for the pressing sheet 23 comprises polytetrafluoroethylene film of approximately 0.001 inch to 0.005 inch in thickness, or a parchment like silicone treated paper of about the same thickness. These materials are readily available, are nonadherent to at least the fused polyamide adhesive material, and are free from deterioration when subject to temperatures well above pressing iron temperatures which may be as high as up to 500° F. when rapid action is desired.

A number of the laminated assemblies of fused heat reactivatable adhesive and appliqué material may be stacked and stored for future use.

For appliquéing, the individually outlined pieces are adapted to be cut as by means of trimming shears from the laminated sheet, and each of the appliqué pieces will carry on its entire back the laminated layer of fused heat reactivatable adhesive. The appliqué pieces are then adapted to be assembled onto the base panel 10 as shown in FIGS. 4 and 5.

For example, the basic basket piece 11 with its handle 12 may be positioned as desired on the base panel 10 and fusedly bonded to the base panel 10 by application of heat and pressure as by means of the heated iron 24. A plurality of the pieces may be fusedly bonded in place at the same time if desired such, for example, as the flower pieces 13 and 15 which interfit with one another and the basket piece 11 and its handle 12. These pieces are relatively position supportive with respect to one another. The appliqué design may then be completed as indicated in FIG. 5, by assembling the remaining appliqué pieces trimmed from the adhesive-fabric laminate, and applying heat and pressure to the assembly as by means of the iron 24 to complete the appliqué design. In this final bonding of appliqué pieces, the leaf pieces 18 are bonded to the base panel 10, and the center pieces 14 and 17 are bonded to their respective flower patterns.

The resulting appliqué article will have the various pieces firmly bonded in the assembly by the heat reactivatable adhesive means 20 as best visualized in FIG. 6 where the appliqué pieces which are in direct face-to-face relation to the base panel 10 are directly bonded to the base panel by the adhesive 20 and the pieces superimposed on the thus bonded pieces, such as the center pieces 17 are bonded by the adhesive to the appliqué pieces on which they are superimposed. After all of the appliqué pieces have been adhesively bonded to the base panel 10, the hem stitching 19 may be applied if desired.

It will be understood that variations and modifications may be effected without departing from the spirit and scope of the novel concepts of this invention.

I claim as my invention:

1. A method of appliquéing, comprising:

supplying a self-supporting dry sheet of heat reactivatable adhesive;

imprinting an appliqué design pattern onto said sheet;

providing appliqué material;

placing said adhesive sheet with said design pattern thereon onto the back of said appliqué material in assembly therewith;

fusing and laminating said adhesive sheet with said appliqué design pattern thereon onto the back of said appliqué material, and thereby transferring said design pattern by said laminating of the adhesive sheet onto said appliqué material;

trimming out of said material an appliqué piece in accordance with the transferred appliqué design pattern;

and bonding said piece to a base panel by reactivating the adhesive lamina on the piece.

2. A method according to claim 1, which comprises imprinting said appliqué design pattern onto said dry heat reactivatable adhesive sheet in a plurality of discrete parts, and effecting said fusing and laminating, trimming and bonding with respect to all of said parts.

3. A method according to claim 1, which comprises laying said heat reactivatable adhesive sheet with said design pattern thereon onto appliqué material, superimposing onto the material and adhesive sheet a pressing sheet which is nonadherent to the fused adhesive, and applying heat and pressure through said pressing sheet and thereby fusing and laminating said adhesive sheet and effecting transfer of said appliqué design pattern with the adhesive lamina thus formed onto the appliqué material.

4. A method according to claim 1, which comprises superimposing another appliqué piece, derived from said material and adhesive laminate, onto said first mentioned appliqué piece and fuse bonding said another piece to said first mentioned piece.

5. A method according to claim 1, which comprises supplying said dry adhesive sheet in the form of polyamide thermoplastic resin.

6. A method according to claim 1, which comprises, superimposing on the assembly and against the adhesive sheet a pressing sheet selected from tetrafluoroethylene film and silicone treated paper, and applying heat and pressure through said pressing sheet onto said assembly for effecting said fusing and laminating of said adhesive sheet to the material and transfer therewith of said appliqué design pattern to the material.

7. Means for combination appliqué design pattern transfer and adhesive lamination to appliqué material, comprising:

a self-supporting dry sheet of heat reactivatable adhesive comprising fusible mesh webbing composed of interlaced fibers having openings therebetween;

and an appliqué design pattern imprinted onto said fibers of the mesh of the sheet;

and adapted for fusing and laminating of said adhesive sheet with said appliqué design pattern thereon onto the back face of appliqué material so that said appliqué design pattern will be transferred with the adhesive to said appliqué material and the design pattern will serve as a guide for cutting out a piece of the material according to the design pattern and the cut out piece can then be applied to and adhesively affixed to a substrate by laying the piece with the adhesive laminate against the substrate and again reactivating the adhesive.

8. Means according to claim 7, wherein said imprinted appliqué design pattern comprises a plurality of discrete part lineations on said adhesive sheet.

9. Means according to claim 8, wherein said discrete part lineations are located on different areas of said adhesive sheet, and imprinted delineation separating said areas.

10. Means according to claim 7, wherein said adhesive sheet comprises polyamide thermoplastic resin.

11. Means according to claim 7, wherein said imprinted pattern comprises colored lineation.

12. Means according to claim 7, wherein said imprinted pattern comprises impressed lineation.

13. A method according to claim 1, which comprises supplying said self-supporting dry sheet of heat reactivatable adhesive in the form of a fusible mesh webbing composed of interlaced fibers having openings therebetween, and effecting said imprinting of an appliqué design pattern onto the fibers of said sheet.

14. A method according to claim 13, which comprises in said fusing and laminating substantially fusing said fibers across said openings and thereby substantially connecting the gaps in the pattern caused by said openings.

15. In a method for appliquéing:

supplying a self-supporting sheet of heat reactivatable adhesive comprising fusible mesh webbing, composed of interlaced fibers having openings therebetween;

imprinting an appliqué design pattern onto the fibers of said sheet, the pattern having gaps caused by said openings;

providing appliqué material;

placing said adhesive sheet with said design pattern thereon onto the back of said appliqué material into assembly therewith;

fusing and laminating said adhesive sheet with said appliqué design pattern thereon onto the back of said appliqué material, and thereby transferring said design pattern by said laminating of the adhesive sheet onto said appliqué material and substantially connecting the pattern across said gaps as a result of said fusing.

* * * * *